United States Patent
Chuda

(10) Patent No.: US 9,447,254 B2
(45) Date of Patent: Sep. 20, 2016

(54) AQUEOUS FLAME RETARDANT COMPOSITION FOR MINERAL FIBER-BASED MAT, AND MATS OBTAINED

(75) Inventor: Katarzyna Chuda, Villejuif (FR)

(73) Assignee: SAINT-GOBAIN ADFORS, Chambery (FR)

(*) Notice: Subject to any disclaimer, the term of this patent is extended or adjusted under 35 U.S.C. 154(b) by 433 days.

(21) Appl. No.: 13/977,855

(22) PCT Filed: Dec. 26, 2011

(86) PCT No.: PCT/FR2011/053195
§ 371 (c)(1),
(2), (4) Date: Jul. 1, 2013

(87) PCT Pub. No.: WO2012/089981
PCT Pub. Date: Jul. 5, 2012

(65) Prior Publication Data
US 2013/0280975 A1   Oct. 24, 2013

(30) Foreign Application Priority Data
Dec. 31, 2010 (FR) .................... 10 05202

(51) Int. Cl.
C08K 5/1525 (2006.01)
C08K 5/1539 (2006.01)
C09K 21/06 (2006.01)
D04H 1/4209 (2012.01)
D04H 1/587 (2012.01)

(52) U.S. Cl.
CPC ........... *C08K 5/1525* (2013.01); *C08K 5/1539* (2013.01); *C09K 21/06* (2013.01); *D04H 1/4209* (2013.01); *D04H 1/587* (2013.01); Y10T 442/2631 (2015.04)

(58) Field of Classification Search
CPC .. C08K 5/1525; C08K 5/1539; C09K 21/06; D04H 1/4209; D04H 1/587; Y10T 442/2631
See application file for complete search history.

(56) References Cited

U.S. PATENT DOCUMENTS

| | | | | |
|---|---|---|---|---|
| 4,666,523 A | * | 5/1987 | Yokota | C08G 65/26 106/209.1 |
| 5,432,000 A | * | 7/1995 | Young, Sr. | A61F 13/511 428/357 |
| 6,469,083 B1 | * | 10/2002 | Opalko | 524/291 |
| 7,317,053 B1 | | 1/2008 | Gelman et al. | |
| 2007/0010386 A1 | * | 1/2007 | Champ | B23B 29/00 493/51 |
| 2010/0129593 A1 | * | 5/2010 | Rempt et al. | 428/95 |
| 2011/0266488 A1 | | 11/2011 | Didier | |

FOREIGN PATENT DOCUMENTS

| | | |
|---|---|---|
| DE | WO0204133 A2 * | 1/2002 |
| FR | 2 940 648 | 7/2010 |
| JP | 2006 299012 | 11/2006 |
| WO | 96 31650 | 10/1996 |
| WO | 02 04133 | 1/2002 |

OTHER PUBLICATIONS

International Search Report Issued Apr. 12. 2012 in PCT/FR11/53195 Filed Dec. 26, 2011.

* cited by examiner

*Primary Examiner* — Jeremy R Pierce
(74) *Attorney, Agent, or Firm* — Oblon, McClelland, Maier & Neustadt, L.L.P.

(57) ABSTRACT

The present invention concerns an aqueous flame retardant composition for mineral fiber-based mats, in particular glass or rock fibers, which comprises:
  at least one thermoplastic or thermoset resin, and
  at least one organic flame retarding agent chosen from:
    a) alkyl ketene dimers (AKDs) of formula (I) below:

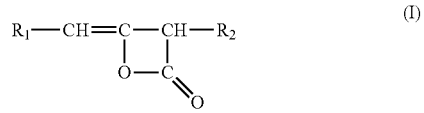

in which $R_1$ and $R_2$, which may be identical or different, represent a $C_4$-$C_{18}$, preferably $C_{12}$-$C_{16}$, alkyl radical; and
    b) alkenyl succinic anhydrides (ASAs) of formula (II) below:

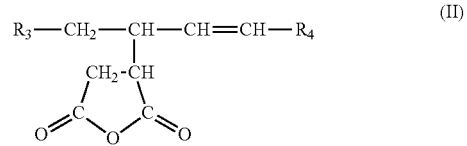

in which $R_3$ and $R_4$, which may be identical or different, represent an alkyl radical, the total number of carbon atoms in these radicals varying from 10 to 18, preferably from 12 to 14.

It also concerns mats treated with said aqueous flame retardant composition.

17 Claims, No Drawings

AQUEOUS FLAME RETARDANT COMPOSITION FOR MINERAL FIBER-BASED MAT, AND MATS OBTAINED

CROSS REFERENCE TO RELATED APPLICATIONS

The present application is a 35 U.S.C. §371 national stage patent application of International patent application PCT/FR2011/053195, filed on Dec. 26, 2011, published as WO 2012/089981 on Jul. 5, 2012, the text of which is incorporated by reference, and claims the benefit of the filing date of French application no. 1005202, filed on Dec. 31, 2010, the text of which is also incorporated by reference.

The present invention relates to the field of mineral fiber-based mats provided with flame retarding properties.

More particularly, it relates to an aqueous flame retardant composition that contains a thermoplastic or thermoset resin and organic flame retarding agents, and mats obtained thereby.

Mats based on non-woven mineral fibers (also known as "nonwovens", "non-wovens" or "veils") are well known and used in many applications, in particular as a surface coating for various materials, in particular thermal insulation and/or acoustic insulation products based on mineral wool.

Such mats can be manufactured using conventional processes operated using "dry" or "wet" procedures.

In the dry procedure, molten mineral matter contained in a furnace is routed to an assembly of dies from which filaments flow under gravity and are stretched by a gaseous fluid. The mineral filaments are harvested on a conveyer where they become entangled, forming a mat.

A binder composition is applied to the upper face of the mat thus formed using suitable equipment, usually by curtain coating, and the excess binder is eliminated by suction from the opposite face. The mat then enters equipment containing hot air wherein the temperature (of the order of 180° C. to 260° C.) and the time period (at most 5 minutes) are such as to eliminate water and cure the binder; the mineral fiber mat is then collected in the form of a roll.

In the wet procedure, the mat is obtained from an aqueous dispersion of cut mineral fibers that is deposited by means of a forming head onto a conveyor provided with perforations; water is extracted through the conveyor by means of a suction box. The cut mineral fibers remaining on the conveyor form a mat that is treated under conditions that are the same as those described for the dry procedure.

In the procedures mentioned above, the binder composition acts to bind the mineral fibers together and to provide the mat containing them with mechanical properties that are suitable for the desired usage, in particular sufficient rigidity to be able to be handled easily, in particular without running the risk of being torn.

The binder composition to be applied to the mineral fibers is generally in the form of an emulsion or an aqueous dispersion containing at least one thermoplastic and/or thermoset resin and additives such as a resin curing catalyst, an adhesion-promoting silane, a flame retardant, etc.

The most widely used thermoplastic resins are resins based on polyvinyl acetate, styrene-butadiene (SBR) and acrylic polymers. The thermoset resins include resins based on formaldehyde, in particular phenolic resins belonging to the resol family, urea-formaldehyde resins and melamine-formaldehyde resins.

One disadvantage of such resins lies in their ready tendency to be consumed in the event of fire when the mineral fiber-based mats are exposed directly to flames.

One well-known method for improving the fire resistance of said mats consists of including in them flame retardant agents such as halogenated compounds, in particular based on bromine or chlorine, or phosphorus-containing compounds. It is also known to use metallic hydroxides; they have the advantage of being less expensive than the preceding flame retardant agents.

Thus, US 2005/0208852 describes a fibrous mat for a bituminous roofing membrane with fibers that are bonded by a flame retardant composition that contains a polymeric binder and an aluminum hydroxide.

EP 2 053 083 A1 proposes a flame retardant composition for fibrous mats that contains at least one organic binder and at least one filler, preferably selected from the following group of compounds: calcium carbonate, mica, clay, aluminum trihydroxide and talc.

U.S. Pat. No. 7,608,550 describes a fibrous mat to cover ventilation duct panels or acoustic and/or thermal insulation panels based on mineral wool. The fibrous mat is based on glass fibers bonded with a composition containing an organic binder and, as flame retardant agents, a metallic hydroxide and carbon black. The preferred metallic hydroxide is magnesium hydroxide or aluminum trihydroxide.

The aim of the present invention is to provide an aqueous flame retardant composition that provides the glass fiber-based mats to which it is applied with improved fire resistance properties.

The aqueous flame retardant composition of the present invention is characterized in that it comprises:
  at least one thermoplastic or thermoset resin, and
  at least one organic flame retarding agent chosen from:
    a) alkyl ketene dimers (AKDs) of formula (I) below:

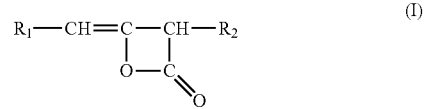

in which $R_1$ and $R_2$, which may be identical or different, represent a $C_4$-$C_{18}$, preferably $C_{12}$-$C_{16}$, alkyl radical; and b) alkenyl succinic anhydrides (ASAs) of formula (II) below:

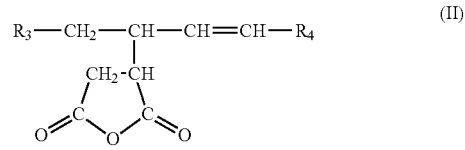

in which $R_3$ and $R_4$, which may be identical or different, represent an alkyl radical, the total number of carbon atoms in these radicals varying from 10 to 18, preferably from 12 to 14.

The thermoplastic or thermoset resin of the present invention may be a styrene-butadiene (SBR), ethylene-vinyl chloride, polyvinylidene chloride, which may or may not be modified, polyvinyl alcohol, ethylene-vinyl acetate (EVA), polyvinyl acetate, ethyl acrylate-methyl methacrylate, non-carboxylic acrylic-acrylonitrile, carboxylic butyl acrylate, polyvinylidene chloride-acrylic acid, methyl methacrylate-styrene, acrylic acid-styrene, polyacrylic acid, or polyurethane resin, a polyester resin, a urea-formaldehyde, melamine-formaldehyde, phenol-formaldehyde epoxy or furan resin, a fluorinated or silicone resin, or a resin originating from a natural material, in particular based on polysaccharides, proteins or lipids. Acrylic resins, urea-formaldehyde resins and mixtures of these resins are preferred.

The quantity of resin represents 20% to 99.9% of the dry weight of the aqueous flame retardant composition and preferably 50% to 90%.

In the aqueous flame retardant composition, the organic flame retarding agent represents 0.1% to 10% of the weight of the resin, and preferably 1% to 8%.

According to a preferred embodiment, the aqueous flame retardant composition further comprises at least one agent for coloring the mat of mineral fibers, in particular carbon black.

The quantity of carbon black represents 10% to 50% of the weight of the resin and preferably 15% to 40%.

The aqueous flame retardant composition of the invention may also comprise at least one mineral filler such as calcium carbonate, a clay, talc or mica. Calcium carbonate is preferred because it contributes to improving the fire resistance properties.

The quantity of fillers in the aqueous flame retardant composition may represent up to 40% of the weight of the resin and preferably up to 30%.

The aqueous flame retardant composition of the invention may also comprise the following conventional additives: organic and/or inorganic pigments, surfactants, rheology-modifying agents (in particular thickeners), antifoaming agents, biocides, stabilizers, in particular thermal oxidation retardants and water repellent agents.

The total quantity of the additives cited above does not exceed 5% of the weight of the resin, preferably 2%.

The aqueous flame retardant composition according to the invention has a solid matter content (dry extract) which varies from 10% to 70% and preferably from 10% to 50%.

The aqueous flame retardant composition of the present invention is intended to be applied to non-woven fiber mats comprising mineral fibers; said mats constitute a further aspect of the invention.

In a first, preferred, embodiment, the aqueous flame retardant composition is deposited on the mineral fiber-based mat (formed using the dry procedure or the wet procedure), then the mat is treated at a temperature that allows curing of the thermoset resin, which then becomes infusible. Curing is carried out at a temperature that is generally in the range 150° C. to 260° C., preferably in the range 180° C. to 220° C., and for a period of at most 3 minutes, preferably 10 seconds to 1 minute, and advantageously 15 to 30 seconds. The mat is then collected up in the form of a roll.

In a second embodiment, the aqueous flame retardant composition is deposited on the mineral fiber-based mat bonded by the binder composition in a supplemental step after collecting up the mat.

The aqueous flame retardant composition is applied to the unrolled mat under the conditions used for applying the binder composition described in the first embodiment. The excess aqueous flame retardant composition is eliminated by suction; the mat then undergoes a heat treatment under conditions identical to those discussed above for the first embodiment, then it is once more collected up in the form of a roll.

The mineral fibers are glass fibers, for example E, C, R or AR (alkali-resistant) glass, or rock fibers, in particular of basalt or wollastonite ($CaSiO_3$), preferably glass fibers. Glass fibers are preferred, advantageously E glass.

The mineral fibers are generally in the form of filaments.

The mineral fiber mat is composed of discontinuous mineral filaments with a length that can be up to 150 mm, preferably in the range 20 to 100 mm and advantageously in the range 50 to 70 mm, and with a diameter that may vary widely, for example from 5 to 30 µm.

Glass fibers may also be in the form of threads composed of a multitude of filaments (or base threads) that are bonded together by a size or into the form of assemblies of such threads into rovings.

The threads cited above may be untwisted threads or twisted (textile) threads, preferably untwisted.

The glass threads are generally cut to a length that may be up to 100 mm, preferably in the range 6 to 30 mm, advantageously 8 to 20 mm and more preferably 10 to 18 mm. The diameter of the glass filaments constituting the threads may vary widely, for example from 5 to 30 µm. In the same manner, large variations may arise in the linear density of the thread, which may be from 34 to 1500 tex.

The mineral fiber mat may comprise synthetic or natural organic fibers, preferably synthetic.

Examples of synthetic fibers that may be cited are fibers based on an olefin such as polyethylene or polypropylene, a polyester such as an alkylene polyterephthalate, especially ethylene polyterephthalate, or a polyamide (nylon). Polyethylene fibers are preferred.

Examples of natural fibers that may be cited are vegetable fibers, especially cotton, coconut, sisal, hemp or linen, and animal fibers, in particular silk or wool.

If necessary, the mat may be reinforced with continuous fibers that are generally deposited on the mat conveying device in the direction of advance of the mat and distributed over all or a portion of the width of the mat. These fibers are generally deposited in the thickness of the mat of fibers, in particular mineral fibers, before applying the binder composition.

The reinforcing fibers may be mineral and/or organic fibers of the same chemical nature as the fibers cited above constituting the mat of fibers of the invention.

Glass reinforcing fibers are preferred.

As a general rule, the fibers that form part of the constitution of the mat in accordance with the invention are constituted by more than 50% by weight of mineral fibers, preferably more than 75% and advantageously 100%. Particularly preferably, the fibers are formed from glass.

The mineral fiber-based mat generally has a mass per unit area in the range 10 to 1100 $g/m^2$, preferably in the range 30 to 350 $g/m^2$, advantageously in the range 35 to 75 $g/m^2$.

The aqueous flame retardant composition generally represents 7% to 30% of the weight of the mineral fiber mat, preferably 10% to 25%, calculated on the basis of the solid materials.

The flame retardant mineral fiber mat of the present invention may be used in numerous applications, for example as a coating, which may or may not be for painting, for application to walls and/or ceilings, as a surface coating or for joining plaster or cement panels, as a surface coating for thermal and/or phonic insulation products such as mineral wool or a foam, more particularly for the insulation of roofs, as a membrane for sealing roofs, in particular shingles, or to produce a floor covering, in particular an acoustic sub-layer.

Preferably, the flame retardant mat is intended for use as a surface coating for mineral wool-based insulation products.

The following examples serve to illustrate the invention without, however, limiting its scope in any way.

In these examples, the fiber mat is subjected to a flame exposure test in accordance with SI standard 755 (class II) [equivalent to ISO standard 11925-2 (class B)]. The flame propagation distance, expressed in mm, is measured, and the appearance of the flame and the presence of an ignition of the zone exposed to the flame (edges or surface depending on the case) are determined. The standard imposes that the flame propagation distance be less than 150 mm.

EXAMPLES 1 TO 4

Aqueous flame retardant compositions were prepared containing the constituents shown in Table 1 in proportions expressed as the % of dry weight.

The various constituents were introduced into a vessel containing water at ambient temperature with moderate agitation until a uniform dispersion was obtained.

The solid matter content (dry extract) of the aqueous flame retardant compositions was equal to 13%.

A mat of E glass fibers was produced using the wet procedure, operating the process in accordance with the first implementation of the invention, wherein the aqueous flame retardant composition was applied by deposition onto the non-bonded fiber mat. The excess binder was sucked off and the mat was placed in an oven at 210° C. for 1 minute.

The mat obtained had a mass per unit area of 60 g/m² and contained 20% by weight of infusible binder.

The results of the flame exposure test are given in Table 1.

The fiber mats of Examples 1 and 3 according to the invention have a smaller flame propagation distance than that of Comparative Examples 2 and 4 which do not contain any flame retarding agent.

TABLE 1

|  | Ex. 1 | Ex. 2 (comp.) | Ex. 3 | Ex. 4 (comp.) |
|---|---|---|---|---|
| Flame retardant composition | | | | |
| urea-formaldehyde resin[(1)] | 70.8 | 72.8 | — | — |
| acrylic resin[(2)] | — | — | 70.8 | 72.8 |
| flame retarding agent | | | | |
| AKD of formula (I)[(3)] | 2 | — | — | — |
| ASA of formula (II)[(4)] | — | — | 2 | — |
| carbon black | 27.2 | 27.2 | 27.2 | 27.2 |
| Properties | | | | |
| flame propagation distance (mm) | <150 | >150 | <150 | >150 |
| appearance of flame | fleeting | fleeting | fleeting | fleeting |
| ignition of the edges | no | yes | no | yes |
| ignition of the surface | yes | yes | yes | yes |

[(1)]Marketed under reference Prefere ® by the supplier DYNEA or under reference Sadecol ® by the supplier SADEPAN
[(2)]Marketed under reference Acrodur ® by the supplier BASF
[(3)]Marketed under reference Aquapel ® J215 by the supplier HERCULES
[(4)]Marketed under reference Prequel ® 725B by the supplier HERCULES

The invention claimed is:

1. An aqueous flame retardant composition, comprising:
 at least one thermoplastic or thermoset resin, wherein the thermoplastic or thermoset resin is an acrylic resin, a urea-formaldehyde resin, or a mixture thereof; and
 at least one organic flame retarding agent selected from the group consisting of:
 a) alkyl ketene dimers (AKDs) of formula (I):

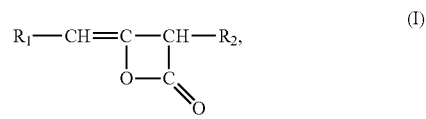

wherein $R_1$ and $R_2$ are each independently a $C_4$-$C_{18}$ alkyl radical; and
 b) alkenyl succinic anhydrides (ASAs) of formula (II):

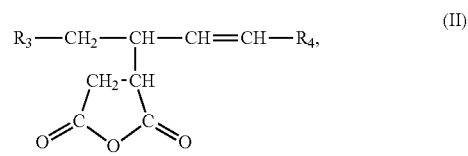

wherein $R_3$ and $R_4$ are each independently an alkyl radical comprising from 10 to 18 carbon atoms,
 wherein the quantity of the thermoplastic or thermoset resin is from 50% to 90% of the dry weight of the aqueous flame retardant composition, and
 wherein the organic flame retarding agent represents from 0.1% to 10% of the weight of the thermoplastic or thermoset resin.

2. The composition of claim 1, wherein the thermoplastic or thermoset resin is a ethyl acrylate-methyl methacrylate, non-carboxylic acrylic-acrylonitrile, carboxylic butyl acrylate, polyvinylidene chloride-acrylic acid, methyl methacrylate-styrene, acrylic acid-styrene, polyacrylic acid, or urea-formaldehyde resin.

3. The composition of claim 1, wherein the thermoplastic or thermoset resin is an acrylic resin.

4. The composition of claim 1, further comprising at least one coloring agent.

5. The composition of claim 4, wherein the coloring agent is carbon black and the carbon black is from 10% to 50% of the total weight of the resin.

6. The composition of claim 1, further comprising at least one mineral filler.

7. The composition of claim 6, wherein the quantity of mineral fillers is up to 40% of the weight of the resin.

8. A mat comprising non-woven mineral fibers, wherein the mineral fibers are treated with the aqueous flame retardant composition of claim 1.

9. The mat of claim 8, wherein the mineral fibers are fibers of glass or rock.

10. The mat of claim 8, wherein the mineral fibers are in the form of filaments, threads composed of a multitude of filaments (base threads), or assemblies of said base threads into rovings.

11. The mat of claim 8, further comprising synthetic or natural organic fibers.

12. The mat of claim 8, having a mass per unit area in the range 10 to 1100 g/m².

13. The mat of claim 8, wherein the aqueous flame retardant composition is from 7% to 30% of the weight of the mineral fiber mat, calculated on the basis of the solid materials.

14. The mat of claim 8, wherein the mineral fibers are formed from glass.

15. The composition as claim 1, wherein the organic flame retarding agent is from 1% to 8% of the weight of the resin.

16. The composition of claim 6, wherein the mineral filler is calcium carbonate, a clay, talc, mica, or a mixture thereof.

17. The mat of claim 8, wherein the mineral fibers are basalt or wollastonite.

\* \* \* \* \*